(12) United States Patent
Carter et al.

(10) Patent No.: US 8,695,762 B1
(45) Date of Patent: Apr. 15, 2014

(54) UPRIGHT TREE STAND

(76) Inventors: Robert Charles Carter, Roxboro, NC (US); Ferdinand Larsh Carter, Hurdle Mills, NC (US)

( * ) Notice: Subject to any disclaimer, the term of this patent is extended or adjusted under 35 U.S.C. 154(b) by 108 days.

(21) Appl. No.: 13/169,576

(22) Filed: Jun. 27, 2011

Related U.S. Application Data (60) Provisional application No. 61/344,323, filed on Jun. 29, 2010.

(51) Int. Cl.
*A01M 31/02* (2006.01)

(52) U.S. Cl.
CPC .................................... *A01M 31/02* (2013.01)
USPC ............. 182/187; 182/8; 182/115; 182/178.2

(58) Field of Classification Search
USPC ............... 182/8, 115, 178.2, 180.1, 187, 194, 182/197, 200, 214
See application file for complete search history.

(56) References Cited

U.S. PATENT DOCUMENTS

| | | | |
|---|---|---|---|
| 91,600 A | 6/1869 | Ostrander | |
| 1,915,715 A | 6/1933 | Bodendieck | |
| 2,060,953 A | 11/1936 | Strom | |
| 2,232,414 A * | 2/1941 | Swann | 182/206 |
| 2,658,416 A | 11/1953 | Duerksen | |
| 2,678,577 A | 5/1954 | Tackett | |
| 2,775,489 A * | 12/1956 | Hagadorn | 182/129 |
| 3,283,621 A | 11/1966 | Faso | |
| 3,336,999 A * | 8/1967 | McSwain | 182/20 |
| 3,995,714 A * | 12/1976 | Brookes et al. | 182/100 |
| 4,257,490 A * | 3/1981 | Bandy | 182/116 |
| 4,688,657 A | 8/1987 | Erickson | |
| 4,787,476 A * | 11/1988 | Lee | 182/116 |
| 5,040,635 A * | 8/1991 | Strickland | 182/100 |
| 5,279,390 A * | 1/1994 | Phillips | 182/187 |
| 5,350,038 A * | 9/1994 | Lazarus | 182/163 |
| 5,368,127 A * | 11/1994 | Phillips | 182/187 |
| 5,460,240 A * | 10/1995 | Jones | 182/116 |
| 5,562,180 A * | 10/1996 | Herzog et al. | 182/187 |
| 5,590,738 A * | 1/1997 | Hunt et al. | 182/116 |
| 5,655,623 A * | 8/1997 | Skyba | 182/116 |
| 5,791,436 A * | 8/1998 | Talley, Sr. | 182/116 |
| 6,053,278 A * | 4/2000 | Myers | 182/20 |
| 6,138,792 A * | 10/2000 | Morris | 182/93 |
| 6,170,609 B1 * | 1/2001 | Dech | 182/187 |
| 6,390,239 B1 * | 5/2002 | McClain | 182/187 |
| 6,523,643 B1 * | 2/2003 | Rizza | 182/187 |
| 6,719,093 B2 * | 4/2004 | Garbs | 182/116 |
| 7,237,649 B2 * | 7/2007 | Harmston | 182/93 |

(Continued)

*Primary Examiner* — Alvin Chin Shue
*Assistant Examiner* — Colleen M Chavchavadze
(74) *Attorney, Agent, or Firm* — Mattingly & Malur, PC (57) ABSTRACT

An upright tree stand includes a base pole section with a support pad, an intermediate pole section or sections, a lowermost one of which is connected to the base pole section by a knuckle hinge, and a top pole section. The top pole section is provided with a top securement assembly which utilizes a self-tapping screw and a remotely operable, dual-action ratchet wrench. The base pole section is initially secured to a tree. The intermediate pole section or sections and the top pole section are then swung, about the knuckle hinge, into an upright position. This movement is accomplished with sufficient force to embed the tip of the self-tapping screw into the tree. Operation of the dual-action ratchet wrench, remotely from the ground, will accomplish the positive securement of the top of the upright tree stand to the tree while the user remains safely on the ground.

16 Claims, 11 Drawing Sheets

(56) References Cited

U.S. PATENT DOCUMENTS

| | | |
|---|---|---|
| 7,314,406 B2 * | 1/2008 | Bilinovich .................... 452/185 |
| D605,914 S | 12/2009 | Brovold |
| 8,011,476 B1 * | 9/2011 | Alcon .......................... 182/206 |
| 2003/0062220 A1 | 4/2003 | Lewis et al. |
| 2006/0207833 A1 | 9/2006 | Kessinger |
| 2007/0169996 A1 | 7/2007 | Blue et al. |
| 2009/0229917 A1 * | 9/2009 | Berkbuegler ................ 182/113 |
| 2010/0089700 A1 * | 4/2010 | Scudera et al. .............. 182/133 |

* cited by examiner

UPRIGHT TREE STAND

CROSS-REFERENCE TO RELATED APPLICATIONS

This application claims priority to U.S. provisional patent application No. 61/344,323, filed Jun. 29, 2010, the disclosure of which is expressly incorporated herein by reference.

FIELD OF THE INVENTION

The present invention is directed generally to an upright tree stand. More specifically, the present invention is directed to a tree stand that is securable to a tree at both its lower and upper limits. Most particularly, the present invention is directed to an upright, erectable tree stand which is securable, at its upper end to a tree by a user who remains on the ground during the erecting and securement of the tree stand. The upright tree stand includes a multi-sectional support pole assembly that includes a base section, one or more intermediate sections and an upper section. The base section is provided with a support pad and with one or more tree engaging stabilizer anchors. The upper section includes a self-tapping screw which is operable from the ground by the operation of a double-acting ratchet wrench assembly. In use, the base section is secured to a tree, the intermediate and upper sections are swung into a generally vertical position to assertively bring the self-tapping screw into penetrating engagement with the tree and the double-acting ratchet unit is operated to positively fasten the upper section of the upright tree stand to the tree, all while the person who will climb the tree stand remains safely on the ground.

BACKGROUND OF THE INVENTION

Tree stands are generally well known in the sport of hunting. Such tree stands typically include a hunter support platform placed in a tree at some distance above the ground, and a mechanism, such as a ladder, to allow the hunter to climb up to, and down from, the tree stand. With the advent of archery hunting seasons, such tree stands have become ever more popular.

A rudimentary tree stand might consist of a simple platform secured to a tree at a height of 10-20 feet above the ground. Such a platform may be constructed either on-site or off-site and transported to the desired location. Once at such a location, it will typically require the combined efforts of several people and one or more ladders to position the platform at the desired height and to secure it to the tree. Once the platform has been so secured, some type of a ladder, such as boards secured to the tree, or a conventional ladder will be required to afford access to, and egress from the simple platform.

Such rudimentary platforms are difficult to make, hard to install, unsafe to use, and are limited to use in only their originally installed position. A platform of lumber, plywood, and the like, is heavy and cumbersome. The need to have several people and several ladders, which must be hauled to a relatively remote hunting location, limits their use. The dangers inherent in attempting to secure the home-built platform to a tree, at a height of 10-20 feet above the ground are obvious. Once the platform has been installed, the task of moving it to a different location restricts its usefulness.

In an effort to overcome some or all of the limitations of these rudimentary tree stands, there has been proposed and implemented a number of portable tree stands which are not intended to be permanently secured to a specific tree. These tree stands are often characterized as ladder stands because they utilize some type of a ladder assembly to allow the user to access the platform which is situated at the top of the ladder. Such ladder stands are inherently unsafe and are still difficult to install. The base of the ladder or other stand can be secured to the base of a tree or supporting pole while the user is standing on the ground. The problem arises in the securement of the upper portion of the ladder or stand to the tree or pole at the top of the stand or ladder. It involves the user climbing up the stand, while the upper end of the stand is still not secured, and the lack of securement of the upper end of the stand while the user is situation at the top of the stand.

Ladder stands of this type need to be leaned against the tree. There is no provision for the securement of the upper end of the stand to the tree other than to climb the ladder and to secure the top of the ladder, while balancing at the top of the ladder. If the ladder slips, or if the user suffers a loss of balance, the result is a possibly very dangerous fall. In view of the fact that tree stands are typically installed in remote locations, the risk of such a fall, and of possible debilitating injury, is a very serious deterrent to the use of such ladder stands. More than 50% of accidents that occur in connection with deer hunting involve tree stands. Such accidents typically involve the hunger falling from the stand. Erecting of tree stands also is a cause of such accidents.

Various other types of tree stands, other than the ladder stands described above, are also available to the hunter and sportsman. They are often intended to be assembled at a point of use and may have a large number of components that have to be bolted or otherwise secured together. If a part is lost or malfunctions during the assembly process, the user must either carry a supply of space parts or must leave the intended point of installation, usually in a relatively remote location, and must obtain the needed part. Even when such other stands, climbers or tree stands have been assembled, they are still inherently dangerous because they have to be secured, at their upper end, to the tree or other support, by the user who is forced to climb up to the top of the stand, while it is not yet secured or attached, at its upper end, to the tree or pole. This inherently unsafe type of securement requirement characterizes the majority of commercially available tree stands.

SUMMARY OF THE INVENTION

It is an object of the present invention to provide an upright tree stand.

Another object of the present invention is to provide a tree stand that is securable to a tree at both its base and upper sections.

A further object of the present invention is to provide an upright tree stand that is attachable, at its upper section, to a tree by a user who is standing on the ground.

Yet another object of the present invention is to provide an upright tree stand which does not require the user to ascend the tree stand to secure its upper end in place.

Even still another object of the present invention is to provide an upright tree stand that is safely assembled on the ground by one person.

Still yet a further object of the present invention is to provide an upright tree stand which is completely assembled, erected and secured to a tree before the individual using the stand leaves the ground.

As will be described in detail in the subsequent description of the preferred embodiments, the upright tree stand in accordance with the present invention utilizes a base section, several intermediate sections, and an upper section. The base section includes a base support and a knuckle joint or hinge.

The intermediate section or sections are assembled by being attached to the base section using fasteners such as bolts or quick release pins, all while the stand is lying the ground. An upper one of the intermediate sections is provided with a support platform, with a seat and optionally with an armrest assembly, all of which are installable while the stand is safely on the ground. The upper section of the upright tree stand is provided with a self-tapping threaded screw and with a remotely operable, dual action ratchet. In use, the base section, intermediate section or sections, and upper section are all assembled while the stand is on the ground.

The base section is secured to the desired tree and the knuckle joint or hinge is utilized to allow the rest of the assembled stand to be pivoted vertically into its upright position. Such movement of the remainder of the upright tree stand into its erected position is done sufficiently assertively to engage the point of the self-tapping screw with the tree, at the upper extent of the stand. The dual action rotatable wrench has laterally extending handles which carry elongated cords. These elongated cords can be grasped, at their lower ends, by the hunter who will use the stand and can be pulled, in an alternating sequence, by the hunter to rotate the self-tapping screw so that it threads itself securely into the tree. In this way, the upright tree stand is secured to the tree both at its base and at its upper terminus, before the hunter ever steps off the ground. These elongated cords are also usable by the hunter to transfer items between the ground and the support platform once the hunter has taken his position on the stand. This allows the hunter to have both hands free during his ascent and descent. The possibility of a fall is again greatly diminished.

In contrast to prior ladder stands, the upright tree stand, in accordance with the present invention, is not leaned against a tree and does not require the user to ascend to the top of the stand before that top has been secured to the tree. In the present invention, the tree stand is secured both at its bottom and its top before the user climbs up the stand. There is no likelihood that the upper section of the upright tree stand will shift or become unstable once it has been secured to the tree using the self-tapping screw. This means that a person who will be using the stand can climb up the stand with confidence, knowing that the stand is positively secured at both its bottom and top before the user leaves the ground. This is a substantial departure from prior devices and is a significant safety advantage.

The upright tree stand in accordance with the present invention is easily transported and erected at the point of use. The several sections of the tree stand are preferably configured with telescopingly engageable end sections that are securable together using either quick release pins or bolts. The support platform, the seat, and, if desired, the optional armrest assembly, are all able to be bolted onto the appropriate one of the intermediate sections, either in the field or before transport to the field.

A fall arresting assembly can be attached to the upper section of the upright tree stand and can be attached to a complementary safety vest or harness which can be worn by the hunter. When the upright tree stand is rotated about its knuckle joint into its erected position, the strap or web of the fall arrester can be deployed so that when the hunter ascends the now erected, upright tree stand, he is secured against an inadvertent fall that might be the result of a false step or a loss of balance. Such an inadvertent fall will not result in any shifting or dislodgment of the tree stand.

If the tree stand in accordance with the present invention is to be shifted to a different location, the double-acting ratchet is used to unscrew the self-tapping screw from the tree, again while the hunter is safety on the ground. The knuckle joint will facilitate the placement of the assembled tree stand on the ground where it can be quickly taken apart into the several component sections. Once so disassembled, the tree stand can be easily transported by a single person to a new location. Once there, it is easily re-assembled, erected, and secured to the tree, again at both the top and bottom, by the single hunter who remains on the ground during the entire assembly procedure.

The upright tree stand in accordance with the present invention is safely and completely assembled by one person on the ground. It is attached at its lower, base section, to the trunk of the tree and is swung into its upright position using the knuckle joint. Once erected, the top of the stand is attached to the tree using the screw and wrench assembly. Once so secured at both top and bottom, additional intermediate securement straps can be attached. The upright tree stand, in accordance with the present invention, is much more stable and secure, in its installation, than are the prior devices. It overcomes the limitations of the currently existing tree stands and is a substantial advance in the art.

BRIEF DESCRIPTION OF THE DRAWINGS

While the novel features of the upright tree stand, in accordance with the present invention, are set forth with particularity in the appended drawings, a full and complete understanding of the invention may be had by referring to the detailed description of the preferred embodiments, which is presented subsequently, and as illustrated in the accompanying drawings, in which.

DESCRIPTION OF THE PREFERRED EMBODIMENT

Figure 1:
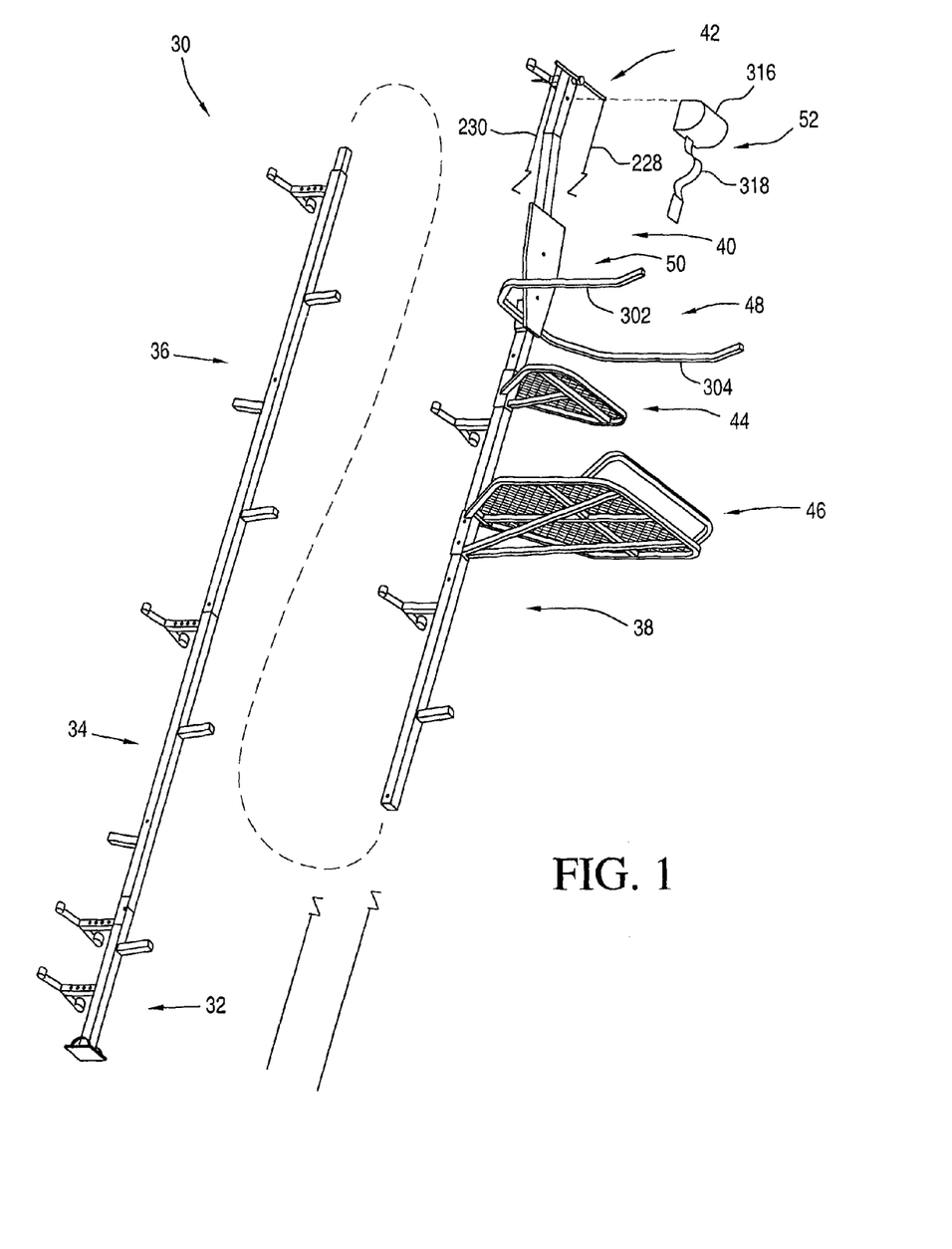
FIG. 1 is an exploded perspective view of a preferred embodiment of an upright tree stand in accordance with the present invention.

Referring initially to FIG. 1, there may be seen, generally at 30, a preferred embodiment of an upright tree stand in accordance with the present invention. Upright tree stand is formed using a base pole section 32, a lower intermediate pole section 34, a center intermediate pole section 36, an upper intermediate pole section 38, and a top pole section 40. When all of these various pole sections are assembled, as will be discussed subsequently, they will allow a sportsman or a hunter to climb to an elevated position from which he can observe the movement of animals of interest.

As will be discussed in detail subsequently, the upright tree stand of the present invention is erectable by a single piece and is structured in such a way that the user does not have to climb to the top of the tree stand before that stand top has been secured. The securement of the top of the upright tree stand is accomplished by the use of a self-tapping securement screw and double-acting ratchet wrench assembly, generally at 42, which will be referred to as the top securement assembly in the discussion that follows.

A seat platform, generally at 44, and a foot platform, generally at 46, are both securable to the upper intermediate pole section 38. An arm rest assembly generally at 48 and a back rest 50 are securable to the top pole section, as is all depicted schematically in FIG. 1. In addition, a fall arrest mechanism, generally at 52, can also be attached to the top pole section 40, all as will be discussed in greater detail subsequently.

Figure 2:
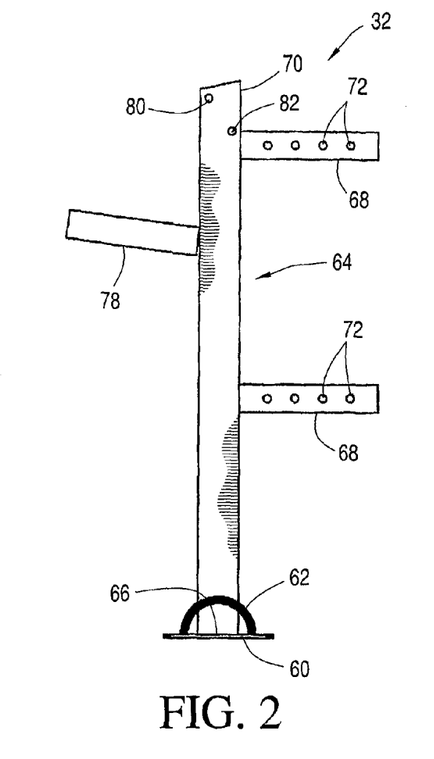
FIG. 2 is a side elevation view of a base pole section of the upright tree stand of FIG. 1.
Figure 12:
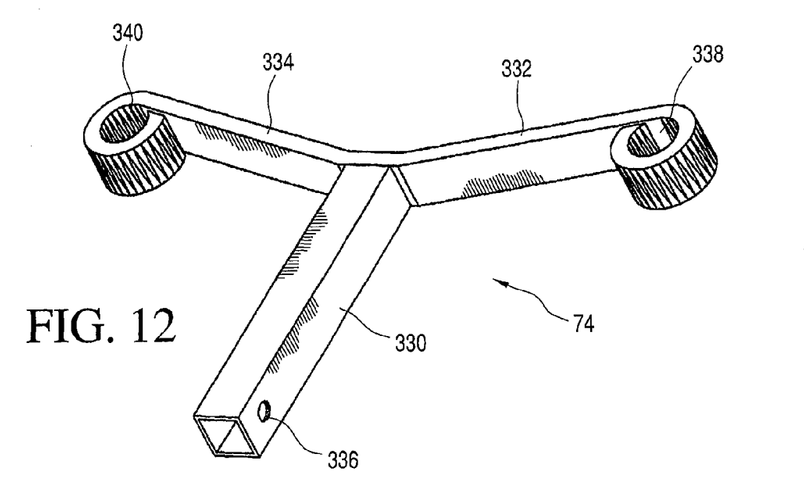
FIG. 12 is a first preferred embodiment of a tree anchor for the subject tree stand.
Figure 13:
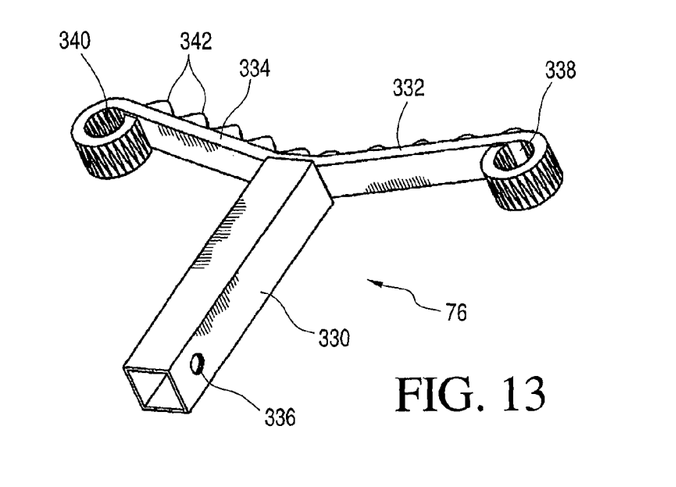
FIG. 13 is a second preferred embodiment of a tree anchor.

Referring now to FIG. 2, there is depicted the base pole section, generally at 32 of the upright tree stand 30 in accordance with the present invention. The base pole section 32 includes a generally planar support pad 60. The support pad is made of a suitable metal, typically steel, and which is typically powder-cooled. It typically has a size of 4" by 4" and a thickness of ⅛". A pair of two semi-circular metal loops 62 can be welded to the support pole 60 on either side of a base tube, generally at 64 and will form handles. A lower end 66 of a base tube 64 is welded or otherwise joined to the base support pole pad, typically centered thereon. The base tube 64, as are the similar tubes used in the rest of the intermediate pole sections 34, 36, and 38, and in the top pole section 40, is typically 16-gauge steel tubing that is 1½ inches square. The tubing is preferably powder coated to a matte finish to provide protection and to decrease reflection. In the preferred embodiment, the base tube 64 has a height of generally 20 inches. It is provided with a pair of spaced tree anchor receiving shafts 68, which are welded or are attached to the base tube 64 intermediate its lower end 66 and a base tube upper end 70. Each of these tree anchor receiving shafts 68 has a series of spaced, aligned securement pin holes 72, whose use will be discussed in detail subsequently. Suffice it to say that these shafts 68 are usable to each adjustably receive one of the tree anchors, generally at 74 or 76, as depicted in FIGS. 12 and 13, respectively. The two tree anchor receiving shafts 68 are preferably spaced from each other by approximately 9 inches with the lower shaft being spaced generally 9 inches above the support pole 60.

On the opposite wall of the base tube 64 and somewhat intermediate the two tree anchor receiving shafts 68, there is provided a lower foot rung 78. As are the rest of the foot rungs which will be discussed subsequently, this lower foot rung 78 is welded or otherwise permanently secured to the base tube 64. Since it will act as a ladder rung when a person climbs up the upright tree stand, its length needs to be sufficient to receive a person's foot. it is attached to the base tube 64 with a slight incline of generally between 5°-10° above vertical to insure that a person's foot will tend to slide inwardly into contact with the base tube 64.

Figure 3:
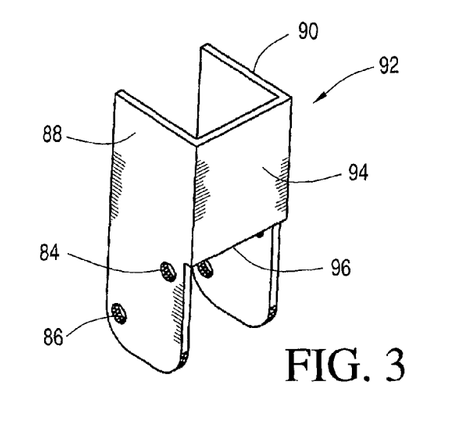
FIG. 3 is a perspective view of a base pole knuckle hinge.

Two sets of offset, aligned holes 80 and 82 are placed adjacent the top 70 of the base tube 64. These two sets of holes are dimensioned to align with two corresponding sets of offset aligned holes 84 and 86 that are formed in two opposing side wells 88 and 90 of a knuckle joint, generally at 92, as seen in FIG. 3. The two knuckle joint side walls 88 and 90 are connected by a transverse knuckle joint web 94 which has a web lower edge 96 that terminates just above the level of the upper ones 84 of the two pairs of aligned, offset knuckle hinge holes 84 and 86.

Figure 4:
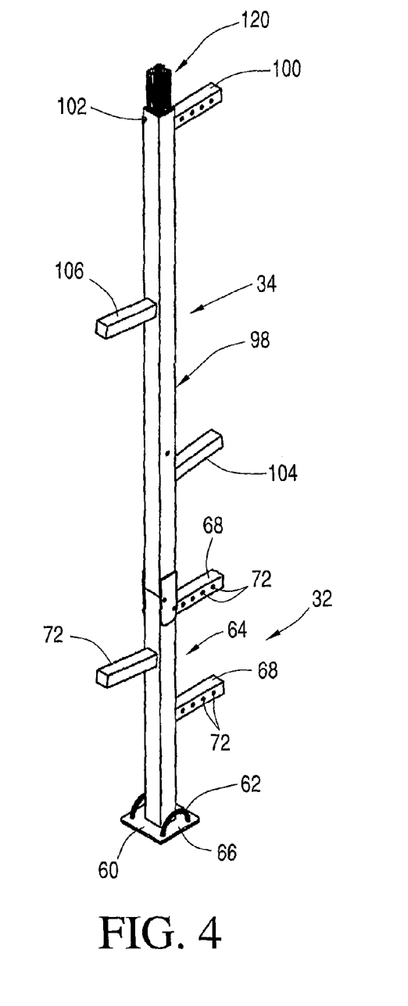
FIG. 4 is a perspective view of the base pole section of FIG. 3 and connected to a lower intermediate pole section using the knuckle hinge depicted in FIG. 3.

As may be seen in FIG. 4, the lower intermediate pole section, generally at 34 is also a 16-gauge steel tube 98 that is 1½"×1½" square and that is also powder coated with a matte finish. As is shown in FIG. 3, it may have the same tree anchor receiving shaft 100 generally adjacent an upper end 102 thereof. A pair of foot rungs 104 and 106 are attached to the lower intermediate tube 98 spaced on opposing sides of the tube 98 and cooperating with the lower tube foot rung 78 to form a sequence of foot steps or rungs that are usable by a person who is to climb the upright tree stand.

Figure 5:
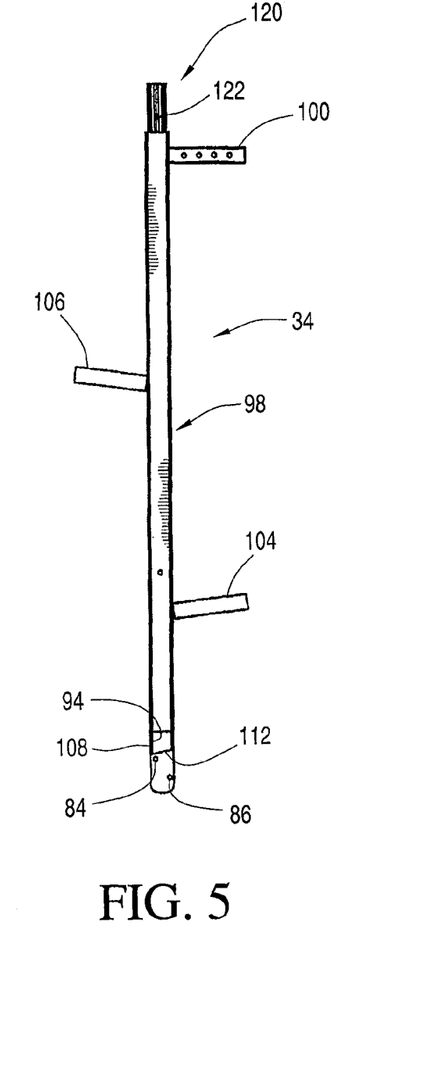
FIG. 5 is a side elevation view of the lower intermediate pole section of FIG. 4 with the attached knuckle hinge of FIG. 3.

As may be seen in FIG. 4 and also in FIG. 5, a lower end 108 of the lower intermediate tube 98 is welded to the knuckle joint 82. The upper end 70 of the base tube 64 and the lower end 108 of the lower intermediate tube 98 are in abutting rotation when the base tube 64 and the lower intermediate tube 98 are aligned, as depicted in FIGS. 4 and 16. A hinge pin generally at 110 in FIG. 16 passes through the aligned upper holes 80 in the base tube and the corresponding upper holes 84 in the knuckle hinge 92. The knuckle hinge 92 is welded to the lower end of the lower intermediate tube 98 with a lower edge 112 of the lower intermediate tube lower end 108 aligned with the lower edge 96 of the knuckle hinge web, the aligned holes 80 and 84 of the lower tube 64 and of the knuckle hinge 92, when connected by the hinge pin 110, will allow the lower intermediate tube 98 to rotate by 90° between an assembly position depicted in FIG. 15 and an erected, use position depicted in FIG. 16. When the lower intermediate tube 98 has been put in its erected position, a suitable securement bolt or a quick release pin, generally at 114 in FIG. 16 can be used to retain the base tube 64 and the lower intermediate tube 98 in generally vertical alignment, as depicted in FIG. 4.

At the upper end 102 of the lower intermediate tube 98, there is inserted a crimped connection insert 120. The crimped connection insert can be welded into the upper end 102 of the lower intermediate tube 98 or can be swaged in place. The crimped connection insert is provided with a through bore 122 that will align with a corresponding through bore 124 that is formed in a lower end 126 of a center intermediate tube 128 which constitutes the center intermediate pole section 36.

Figure 6:
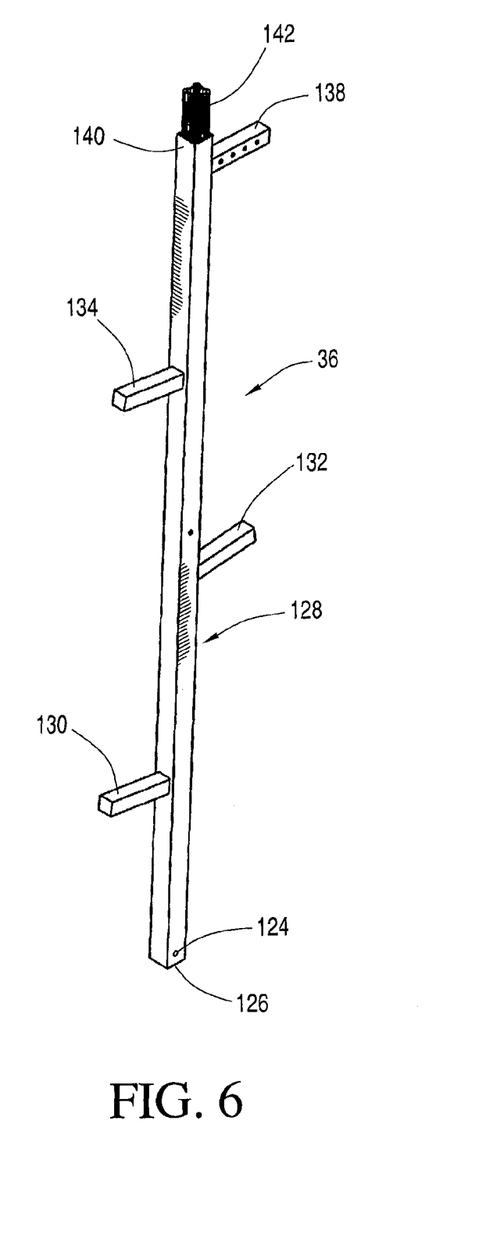
FIG. 6 is a perspective view of a center intermediate pole section of the upright tree stand in accordance with the present invention.

This center intermediate pole section 36 is, as are the two other pole sections described previously, formed of 16-gauge square steel tubing of 1½×1½ inches and which is preferably powder coated with a matte finish. In a preferred embodiment, it has an overall length of 64" and includes three spaced foot rungs 130, 132, and 134, which are spaced from each other on alternating sides of the center intermediate tube at generally 15 inches. These center individual tube foot rungs 130, 132, and 134, are angled up, again at between 5°-10° above horizontal to insure that a user's foot will not slip off. While not specifically depicted, it will be understood that these foot rungs, as may all of the foot rungs in this upright/tree stand assembly, can be provided with a slip reducing upper surface, either formed directly on the upper surface of each rung or applied thereto. The intent is to make these foot rungs as slip resistant as possible.

The lower end 126 of the center intermediate tube 128 is sized to telescopingly receive the crimped connection insert 120 formed at the top of the lower intermediate tube. Once the bore 122 in that crimped connection insert 120 has been aligned with the through bore 124 at the lower end 126 of the center intermediate tube, 128, a suitable quick release pin or a bolt can be inserted and will prevent inadvertent separation of the assembled sections.

A tree anchor receiving shaft that is essentially the same as the previously described tree anchor receiving shaft 68 and 100 on the base tube 64 and on the lower intermediate tube 98, respectively, can be welded or otherwise connected to the center intermediate tube 128 generally adjacent an upper end 140 of the center intermediate tube 128.

A crimped connection insert 142, which is the same as the crimped connection insert 120 previously described in connection with the lower intermediate tube 98, will be secured to the upper end 140 of the center intermediate tube 128. This center intermediate tube crimped connection insert 142 will, in turn, be securable in a bottom portion 144 of an upper intermediate tube 146 that forms the body of the upper intermediate pole section 38, as is seen most clearly in FIG. 7. As was the case with the center intermediate tube 128, the upper intermediate tube 146 also has a through bore 148 which will align with a correspondingly positioned through bore, which is not specifically depicted, and which is located in the crimped connection insert 142 that is held in place in the upper end 140 of the center intermediate tube 128.

Figure 7:
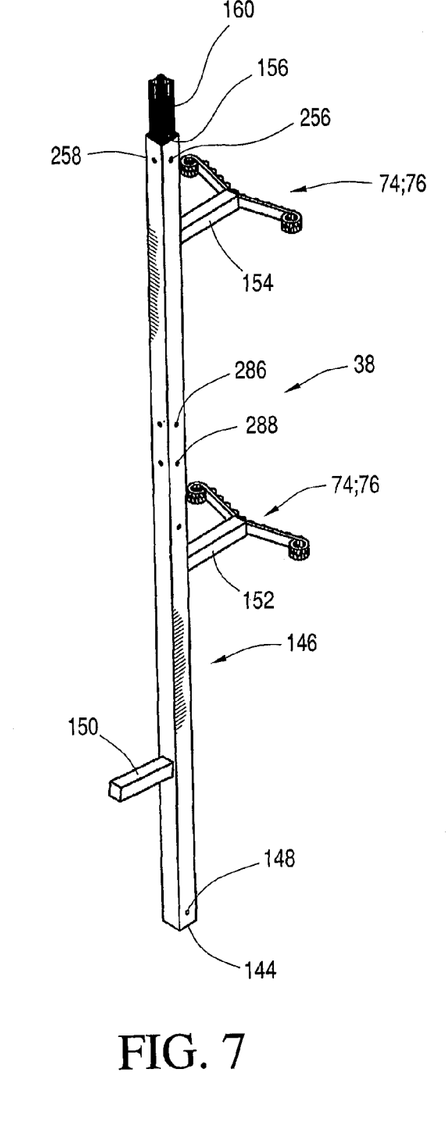
FIG. 7 is a perspective view of an upper intermediate pole section of the upright tree stand assembly.

As may be seen in FIG. 7, the upper intermediate pole section, generally at 38, is comprised of the upper intermediate tube 146 which again is a 16-gauge steel tube that is 1½×1½ inches in size and which is preferably powder coated and has a matte finish. One foot rung, which is similar to the previously described foot rungs, is secured to one side of the upper intermediate tube 146. A pair of tree anchor receiving shafts 152 and 154 are secured to the opposite side of the upper intermediate tube 146. Each of these tree anchor receiving shafts is depicted, in FIG. 7, as having received a tree anchor, generally at 74 or 76, as will be discussed in greater detail subsequently. An upper end 156 of the upper intermediate tube 146 is again provided with a crimped connection insert, generally at 160. The crimped connection insert 160 is the same, in structure and function, as the several previously described crimped connection inserts.

Figure 8:
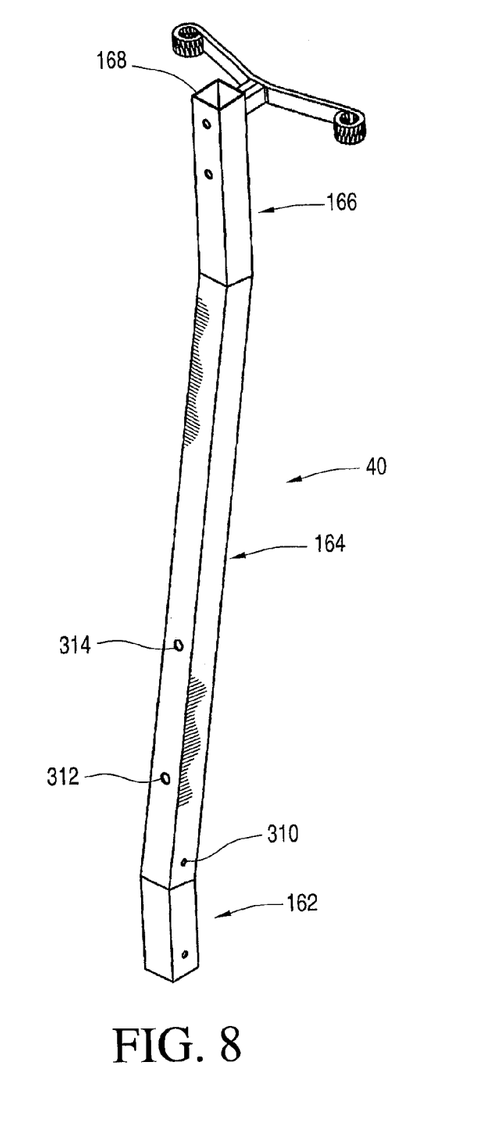
FIG. 8 is a perspective view of a top pole section of the tree stand and showing an upper tree anchor.

The top pole section 40 of the upright tree stand, in accordance with the present invention, is depicted in detail in FIG. 8. This top pole section 40 is defined by a lower top tube 162, a central top tube 164, and an upper top tube 166. These three tube elements are preferably permanently joined together, as by welding or the like. It will be noted that the lower top tube 162 and the upper top tube 166 are offset vertically from each other by a slight angling of the central top tube 164. This offset or angulation is done for a specific purpose, as will be discussed shortly. The upper top tube 166 has an upper end 168. Adjacent that upper end 168 there is situated a tree anchor that is preferably permanently secured to the upper end 168 of the upper top tube 166. It will be discussed below in greater detail.

Figure 9:
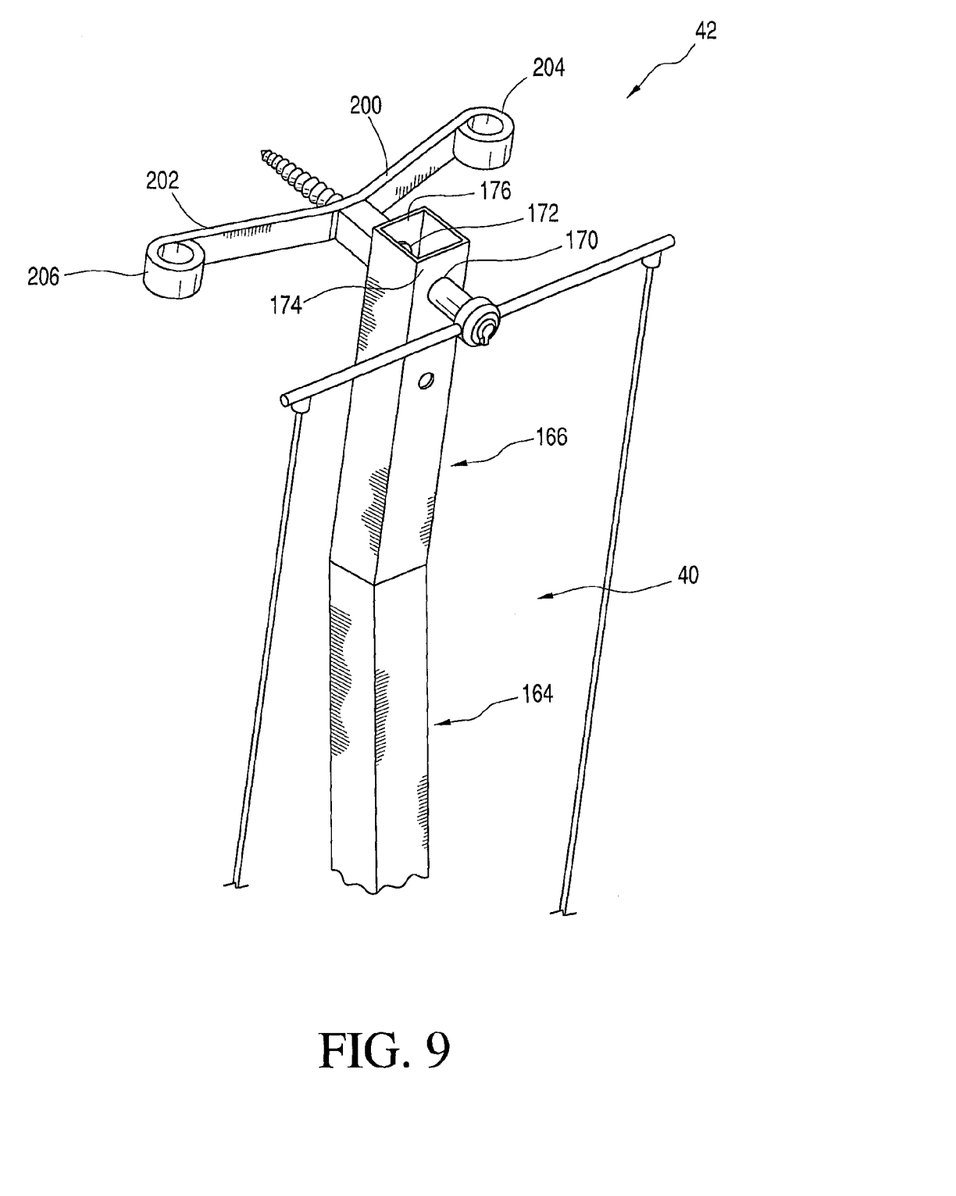
FIG. 9 is a perspective view of the upper portion of the top pole section and showing the self-tapping securement screw and the double-acting, remotely operable ratchet wrench in accordance with the present invention.
Figure 10:
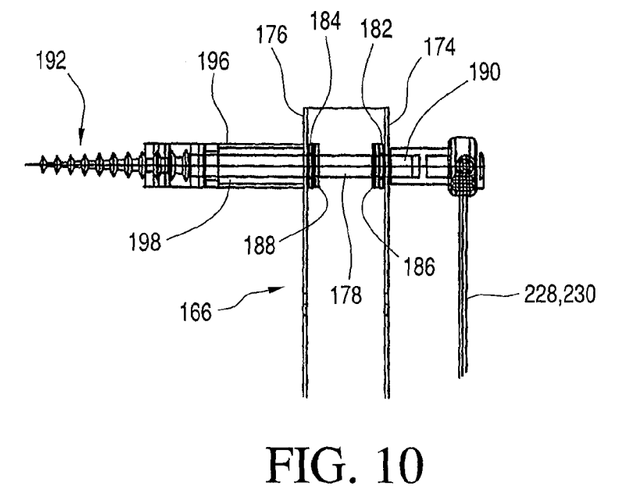
FIG. 10 is a side elevation view of the upper portion of the top pole section of the upper portion of the top pole section of the tree stand of the present invention.
Figure 11:
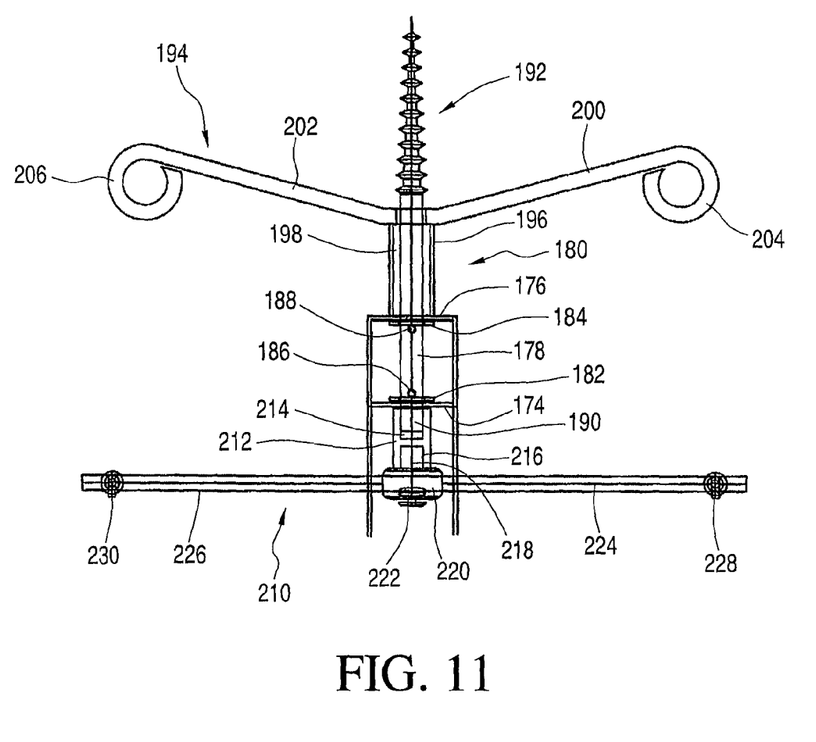
FIG. 11 is a top plan view of the upper portion of the top pole section depicted in FIG. 10.

As may be seen generally in FIG. 1, and as will now be described in greater detail, the top securement assembly, generally at 42 and which is usable to secure the upper end of the upright tree stand to a tree and to unsecure the upper end of the tree stand from the tree, will now be discussed in detail. Referring initially to FIG. 9, the upper top tube 166 is provided with two upper through bores 170; 172 that are formed in opposite upper top tube walls 174 and 176, respectively. As may be seen perhaps more clearly in FIGS. 10 and 11, a shank 178 of an elongated self-tapping screw generally at 180 passes through the two bores 170 and 172 in the opposing upper top tube walls 174 and 176. A pair of washers 182 and 184 are secured on the shank 178 by a pair of roll pins 186; 188. A head 190 of the self-tapping screw 180 is situated on one end of the shank 178 on the opposite side of the upper top tube wall 174 than the first washer 182. A screw thread 192 is formed on the shank 178 of the self-tapping screw 180 at an end of the shank 178 opposite to the screw head 190. The shank 178 of the self-tapping screw is retained between the upper top tube walls 174 and 176 by the cooperation of the two anchors 182 and 184 and the two roll pins 186 and 188. If the self-tapping screw were to be damaged or broken, it can be replaced by removal of the roll pins 186 and 188. This will allow the screw to be slid out of the upper top tube 166.

Figure 14:
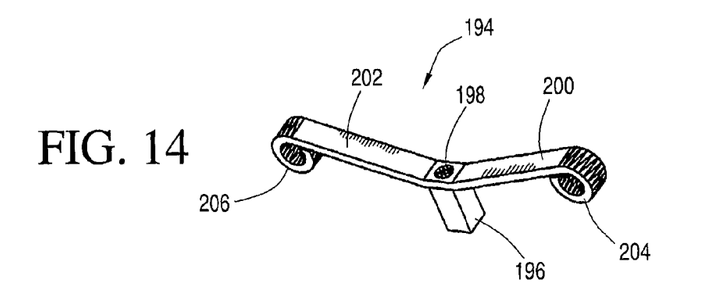
FIG. 14 is a perspective view of the tree anchor portion of the securement screw assembly of FIGS. 9 and 11.

As was alluded to previously, an upper tree anchor, generally at 194, is secured to the upper top tube 166, generally adjacent its upper end. The upper tree anchor 194 is depicted in FIG. 14. In contrast to the other tree anchors depicted at 74 and 76, in FIGS. 12 and 13, respectively, and which will be discussed below, the upper tree anchor 194 is preferably permanently attached, such as by welding, to the side wall 176 of the upper top tube 166 on the side of the upper top tube adjacent to the screw-threaded portion 192 of the self-tapping screw 180.

The upper tree anchor is generally T- or Y-shaped and has a short stem 196 which is provided with a through bore 198. The shank 178 of the self-tapping screw 180 passes through the bore 198 which is aligned with the upper top tube bores 170 and 172. A pair of arms 200 and 202 diverge outwardly from the short stem 196 of the upper tree anchor 194. A securement eye 204; 206 is formed at an outboard end of each such upper tree anchor arm 200; 202, respectively.

A dual-action ratchet wrench assembly, generally at 210, is attached to the head 190 of the self-tapping screw 180. As will be discussed below, it is important that this ratchet wrench assembly 210 is quite securely attached to the head 190 of the self-tapping screw 180. A wrench socket 212 has a screw head receiving well or aperture 214 and also has a wrench drive socket receiving well 216. A drive socket 218 of the ratchet wrench 210 is securely receivable in the drive socket receiving well 216. The ratchet wrench 210 has a ratchet mechanism 220 with a selectable drive pawl 222. A pair of ratchet wrench arms 224 and 226 extend outwardly from the ratchet mechanism 220. As may be seen in FIGS. 1 and 10, a pair of elongated, flexible cords 228 and 230 are connected to the outboard sides of the two wrench arms 224 and 226. These cords 228 and 230 are long enough to enable a person, who is standing on the ground, to manipulate the ratchet wrench 210 when the upright tree stand is in its erected position.

Figure 17:
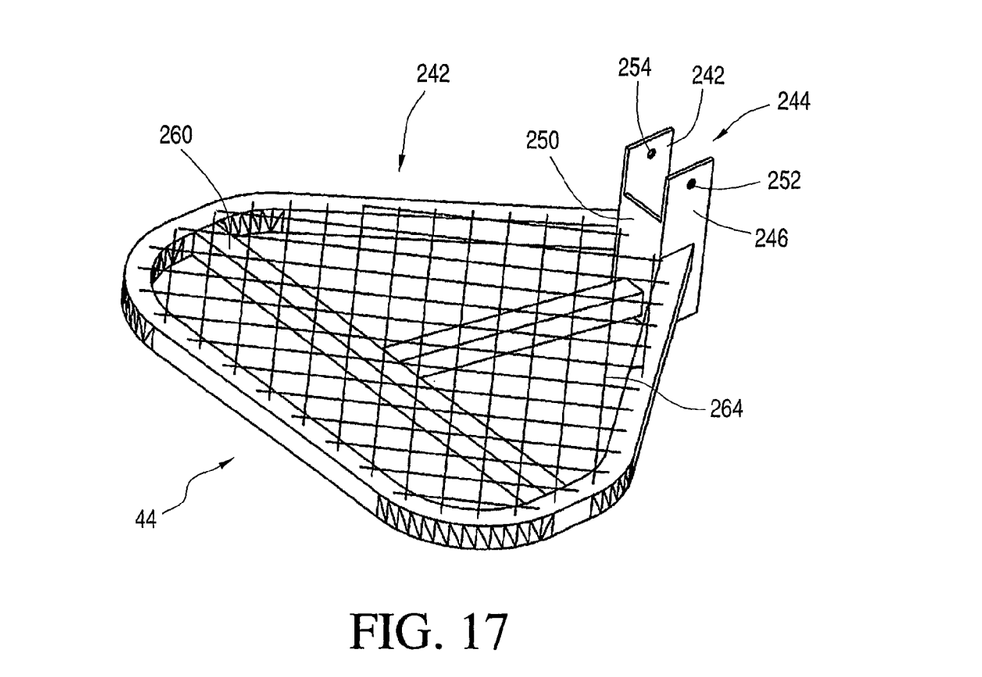
FIG. 17 is a perspective view of a seat platform for attachment to the upright tree stand.
Figure 18:
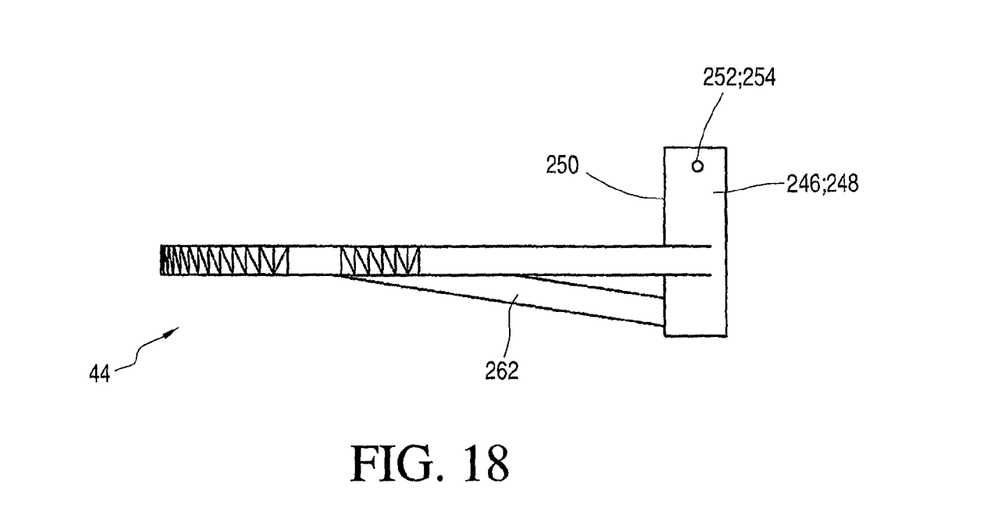
FIG. 18 is a side elevation view of the seat platform of FIG. 17.

As may be seen in FIG. 1, a seat assembly, generally at 44, and which is depicted in more detail in FIGS. 17 and 18, is securable to the upper intermediate pole section 138. As seen in FIGS. 17 and 18, a generally triangular seat frame 242 is provided, and is fabricated with a seat connection sleeve 244, generally at its apex. The seat connector sleeve 244 is a generally U-shaped sleeve with spaced sleeve side walls 246 and 248 and a seat anchor sleeve end wall 250 to which the seat frame 242 is connected. A pair of aligned holes 252 and 254 are positioned in upper sides of the seat sleeve connector side walls 246 and 248. These holes are alignable with cooperating bores 256; 258 in the upper end of the upper intermediate pole section 38, as seen in FIG. 7. A transverse seat frame bar 260 extends across the side frame 242 generally adjacent a base portion thereof. A seat brace tube 262 extends down from the transverse seat frame bar 260 and is welded to the seat connection sleeve end wall 250 between the point of attachment of the seat frame 242 to the seat connection sleeve 244. The seat assembly can be removably attached to the upper end of the upper intermediate pole section 38 by the use of either a bolt and nut assembly or by a quick release pin. The seat assembly is preferably provided with a wire mesh seat surface 264.

Figure 19:
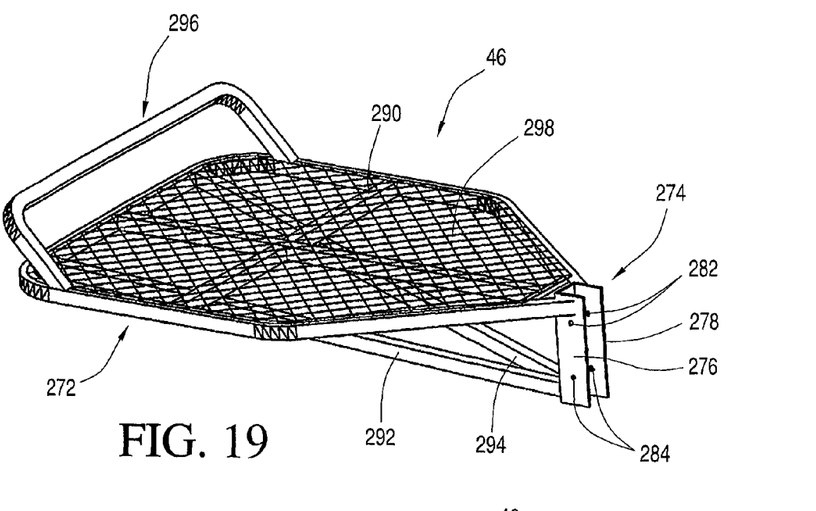
FIG. 19 is a perspective view of a foot platform for the upright tree stand.
Figure 20:
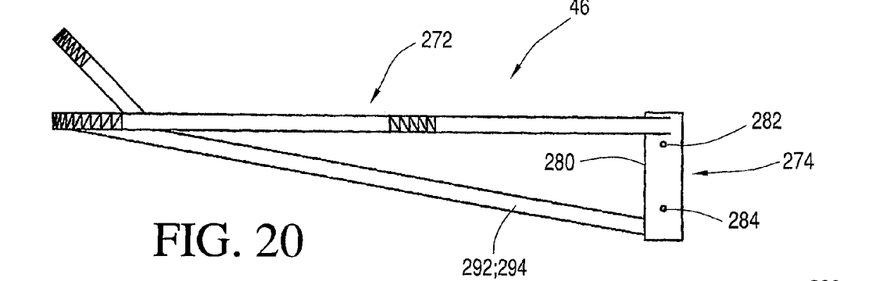
FIG. 20 is a side elevation view of the foot platform shown in FIG. 19.
Figure 21:
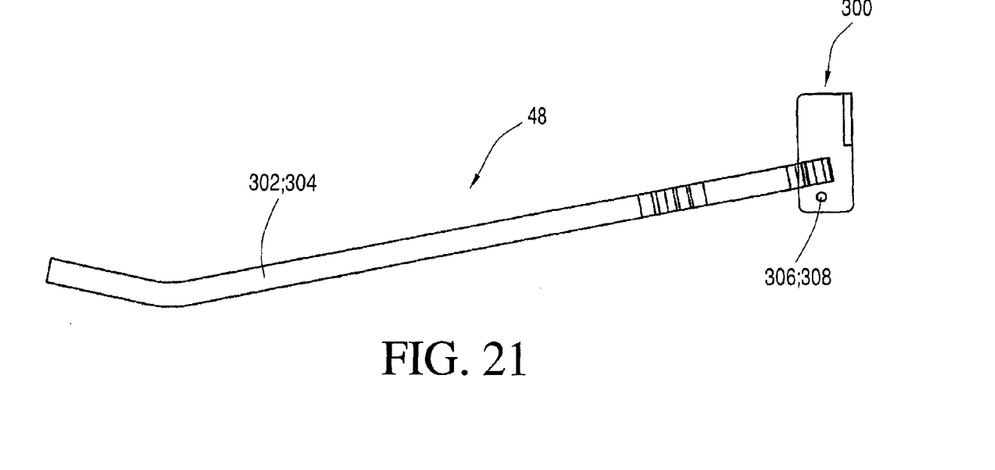
FIG. 21 is a side elevation view of an arm rest usable with the seat platform of the subject upright tree stand.

A generally similar foot support platform 46 is depicted in FIGS. 19 and 20. This support platform has a generally trapezoidal support platform frame 272. As was the case with the seat frame, the support platform frame 272 is also preferably made of 16-gauge 1½×1½ inch steel tubing. It is provided with a support platform connection sleeve 274 which has two sleeve side walls 276 and 278 and a support sleeve end wall 280. Again, spaced holes 282; 284 are provided in the support sleeve side walls 276 and 278. These align with corresponding bores 286 and 288 located intermediate the ends of the upper intermediate pole support 38. Again, the support connection sleeve 274 can be secured to the upper intermediate pole section by using suitable bolts and nuts or by the use of quick release connection pins. The support platform frame 272 includes a cross-shaped frame reinforcement bar 290 and a pair of support frame braces 292; 294. These extend from an outer section of the support platform frame 272 to the end wall 280 of the support platform connection sleeve 274. A footrest and edge guard 296 is welded to the top of the support platform frame 272 adjacent its outer end. A suitable wire or steel mesh 298 is secured to the top of the support platform frame 272.

An armrest assembly, generally at 48, can also be provided. As seen in FIG. 1, the armrest assembly 48 is securable to the lower end of the top pole section 40. Armrest assembly 48 has an armrest attachment sleeve 300 and a pair of arcuate armrest arms 302 and 304. The armrest attachment sleeve 300 is provided with aligned bores 306 and 308 which are alignable with cooperating bores 310 in the lower portion of the top pole section 40.

A backrest, generally at 50, is also securable to the top pole section 40. A pair of spaced backrest attachment bars 312 and 314 are provided in the intermediate portion of the top pole section 40. It will be understood that the seat platform 44 and the foot platform 46 are required. The armrest 48 and the backrest 50 are optional.

While also optional, the inclusion of the fall arrestor, generally at 52, is also strongly advised. The fall arrestor 52, which is depicted schematically at 50 in FIG. 1, will include a housing 316, a sturdy fall arrestor strap, and a fall arrestor connection fitting 320. The fall arrestor 52 is securable to the upper end of the top pole section 40, just between the top securement assembly 42. It will stop a fall of a person who is attached to it, typically by wearing a cooperating vest or harness. Again, while it may not be required, its use is highly suggested.

Each of the plurality of pole sections 32; 34; 36; 38; and 40 that are assemblable together to form the upright tree stand 30 in accordance with the present invention is provided with at least one tree anchor either 74 or 76, as depicted in FIGS. 12 and 13 or the upper tree anchor 194 which is depicted in FIG. 14, and which has been discussed to some extent in connection with the top securement assembly 42.

Each of the tree anchors 74 and 76 depicted in FIGS. 12 and 13, respectively, is generally the same and each has an anchor sleeve 330 which is provided, at its end section from its two diverging tree engagement arms 332; 334, with a through bore 336. As was discussed previously, each of the several spaced tree anchor receiving shafts 68; 100; 138; 152; 154 has a plurality of spaced transverse bores, such as the transverse bores 72, depicted in FIGS. 2 and 4, for example. The sleeve 330 of each of the tree anchors 74 or 76 is telescopingly engageable over an associated one of the tree anchor receiving shafts 68; 100; 138; 152; or 154, respectively. Depending on the space that will exist between the individual tree anchor and the portion of the tree against which it will be engaged, the positioning of each tree anchor on its associated shaft can be varied by the insertion of a quick release pin or a bolt through the bore 336 in the stem of the anchor and one of the spaced bores 72 on each shaft. Each of the tree engaging arms 332; 334 of each tree anchor terminates in a securement eye 338; 340. The anchor 76 differs from the anchor 74 by its inclusion of tree engaging teeth 342. These may be welded or otherwise secured to the engaging surface of the tree engaging arms 332; 334.

In use, the seat platform 44, the foot platform 46, the optional armrest 48 and backrest 50, as well as the fall arrestor 52, can all be secured to the upper intermediate pole section 38 and to the top pole section 40 before the upright tree stand is carried into the woods. The base pole section 32 will also typically be joined to the bottom of the lower intermediate pole section 34, using the knuckle hinge 92. The center intermediate pole section 36 will typically not be joined to the lower intermediate pole section 34 and to the upper intermediate pole section 38 until the upright tree stand is at the point of use. This facilitates ease of transport of the stand through woods and underbrush. It will be understood that the use of the other intermediate pole section 36, and the height of such an intermediate pole section 36, is a function of the desired elevation of the seat platform 44 above the ground. It would also be possible to utilize two intermediate pole sections, if desired, to raise the height of the seat platform and foot support platform relative to the ground.

Figure 15:
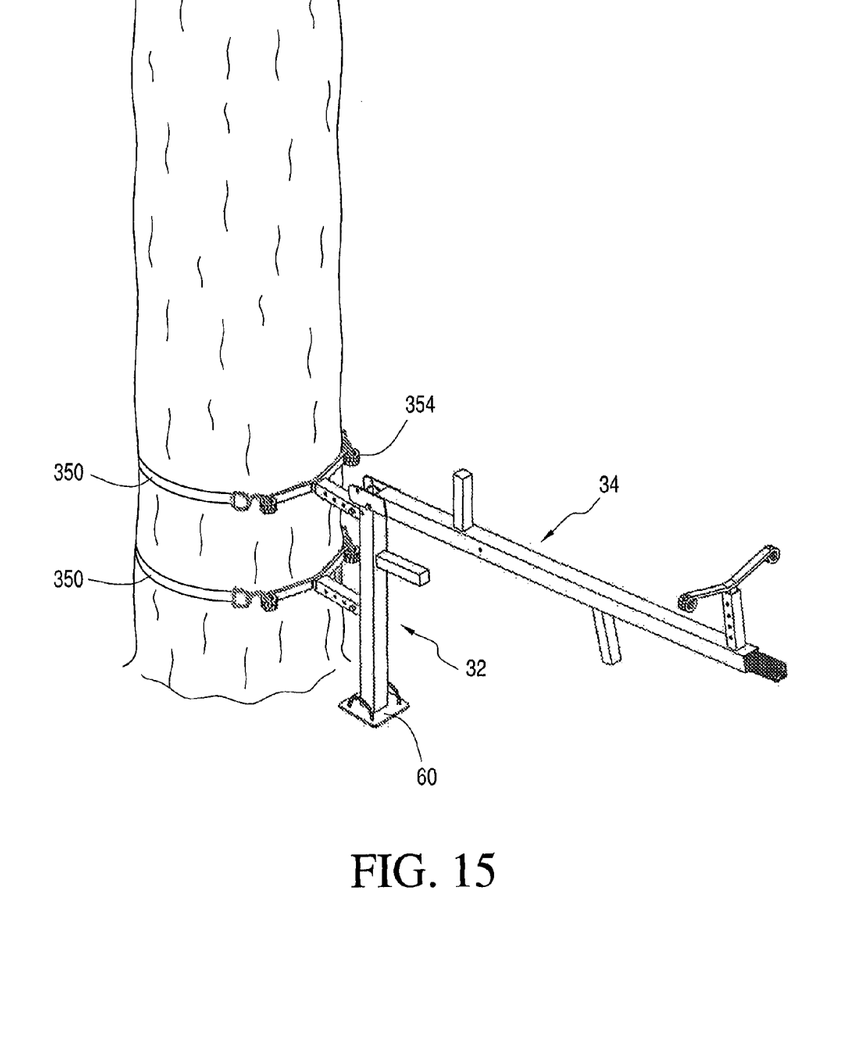
FIG. 15 is a schematic perspective view of the bottom of the upright tree stand, in accordance with the present invention, in its position attached to the base of a tree and prior to being erected.
Figure 16:
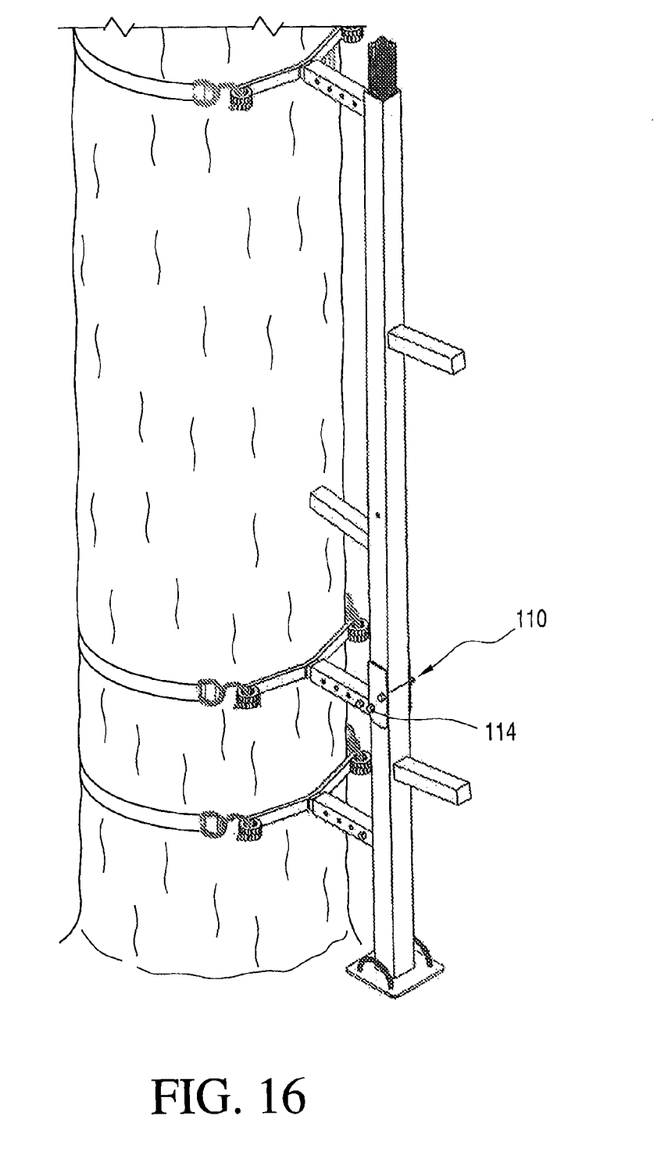
FIG. 16 is a view similar to FIG. 15 and showing the bottom of the upright tree stand after it has been erected'

Turning now initially to FIG. 15, there may be seen the placement of the base pole section 32 and the lower intermediate pole section 34 in place adjacent to a tree. While not depicted here, it will be understood that a center intermediate pole section, and an upper intermediate pole section, as well as a top pole section, will be secured to the lower intermediate pole section 32. The support pad 60 will be placed on the ground adjacent to the base of a tree, which is schematically depicted in FIG. 15. This will be done with the lower intermediate pole section 34 and the rest of the tree stand extending generally parallel to the ground. If the two lower tree anchors, either 74 or 76, have not been attached to their respective shafts 68, this is now done. As discussed above, the arms of the two tree anchors 74 and 76 are adjustably positioned against the trunk of the tree by suitable adjustment of the stem bore 336 with one of the shaft bores 72. Quick release pins or bolts, that are not specifically depicted, are inserted through the alignment bores 336 and 72.

The two tree anchors 74 or 76 that are provided on the base pole section 32 are positioned with their arms 332 and 334 against the trunk of the tree. Tree encircling ratchet straps, generally at 350, are engaged with the tree anchors by placement of strap hooks 352 into the securement eyes 338 and 340 of each arm 332 and 334 of each tree anchor. A ratchet strap tightening ratchet 354 is operated to tighten the straps 350 about the tree trunk thereby securely holding the base pole section in place.

As depicted in FIG. 15, the knuckle hinge 92 between the top of the base pole sleeve 32 and the lower end of the lower intermediate pole section 34 allows the securement of the base pole section 32 to the tree trunk while the rest of the upright tree stand is effectively lying on the ground. The support platform 46 will act to hold the rest of the upright tree stand generally horizontal during this initial installation process. Alternatively, several ones of the lower ratchet straps can be tightened to bring the lower tree anchors into solid contact with the tree. This will generate sufficient force to cause the threaded screw to positively engage the tree when the drive ratchet is operated with the hunter still safely on the ground.

Once the base part section 32 has been securely attached to the tree trunk, a single person can elevate the rest of the upright tree stand about the knuckle hinge 94. The upright tree stand is raised into its upright position with sufficient speed and force to cause the point of the self-tapping screw 180 of the top sectional assembly, generally at 42, to become embedded in the tree. Once this has been accomplished, the double-acting ratchet wrench 210, whose ratchet pawl has been placed in a forward driving position, can be operated to screw the self-tapping screw 180 into the tree. This is accomplished by the single user, through manipulation of the elongated flexible cords 228; 230, all while the user remains safely on the ground. If the top of the screw fails to properly penetrate the tree on an initial attempt, a subsequent attempt, preferably with more assertive force, will typically result in the positive engagement of the threaded screw into the tree.

Once the top securement assembly 42 has been operated to bring the upper tree anchor 194 into abutting engagement with the tree, a quick release pin or a bolt can be placed in the lower alignment holes 86 of the knuckle hinge and in the lower holes 82 in the top of the base pole section. This will insure that the upright tree stand is now positively held in place at both its top and bottom.

Preferably before the upright tree stand was swung into the upright position, as depicted in FIG. 16, the several intermediate pole section tree anchors were secured to their shafts in positions adjusted as close to the pole as possible. The user of the tree stand can now start to climb the stand, preferably after having attached the fall arrestor to his safety vest or harness. As the person climbs the tree stand, he will attach a ratchet strap to each of the tree anchors and will then proceed up the tree stand, using the foot rungs and the tree anchor shafts as a ladder. Once at the top of the tree stand, the user will place another ratchet strap about the tree and connect it to the upper tree anchor. The upright tree stand in accordance with the present invention is now in its use configuration.

The upright tree stand can be easily and quickly disengaged from the tree by essentially reversing the procedure used for its installation. The user will shift the pawl of the double-acting ratchet wrench to a retraction setting and will dismount the tree stand, removing the ratchet straps as he climbs down. Once on the ground, the user will again operate the dual-acting ratchet wrench by alternatively pulling on the two elongated cords, to cause the self-tapping screw to be retracted out of the tree. Once this has been accomplished, and the quick release pin or the second bolt and nut has been removed from the lower aligned bores in the knuckle hinge and in the top of the base pole section, the upper portion of the upright tree stand can be pivoted back down to the position depicted in FIG. 15. The two tree trunk encircling ratchet straps at the base of the tree can be removed. The base pole section, the intermediate pole section or sections, and the top pole section can be disassembled, by removal of the quick release pins or bolt and by separation of the crimped connection inserts at the top of the intermediate pole section or sections from the securing socket in the bottom of the next above pole section. Once so disassembled, the components of the upright tree stand, in accordance with the present invention, can be moved by a single person to a new point of use. In each deployment and subsequent take-down of the upright tree stand in accordance with the present invention, the single user stays safely on the ground until the top of the stand is secured in place by use of the top securement assembly. The single user also stays safely on the ground as the top securement assembly is used to disassemble the top of the tree stand from the tree. At no time does the user climb up or down the pole of the upright tree stand without the top of the stand being firmly connected to the tree. The upright tree stand in accordance with the present invention is truly a much safer tree stand than any of its predecessors.

While a preferred embodiment of an upright tree stand, in accordance with the present invention, has been set forth fully and completely hereinabove, it will be apparent to one of skill in the art that various changes in, for example, the specific dimensions of the component parts, the number of intermediate pole sections, the type of fall arrestor, the specific structure of the quick release pins, and the like, could be made without departing from the true spirit and scope of the present invention which is accordingly to be limited only by the following claims.

What is claimed is:

1. An upright tree stand comprising:
   a base pole section having a lower support and a base section upper end;
   at least one intermediate pole section having an intermediate pole section lower end and an intermediate pole section upper end;
   a hinge connecting said base pole section upper end and said intermediate pole section lower end for pivotable movement of said at least one intermediate pole section between a horizontal non-use position and an upright use position;
   a top pole section having a top pole section lower end separably connectable to said at least one intermediate pole section upper end; and
   a top securement assembly on said top pole section, said top securement assembly including a self-tapping screw, rotatable supported for rotation in said top pole section and including a shank and a screw head, and a remotely operable dual-acting ratchet wrench.

2. The upright tree stand of claim 1, further including at least one tree anchor secured to at least one of said base pole sections, said at least one intermediate pole section, and said top pole section.

3. The upright tree stand of claim 2, wherein each of said base pole section, said at least one intermediate pole section, and said top pole section has at least one of said tree anchors.

4. The upright tree stand of claim 2, wherein said at least one tree anchor has a tree anchor stem and a pair of tree engaging arms.

5. The upright tree stand of claim 4, further including a securement eye at an end of each said tree engaging arm remote from said tree anchor stem.

6. The upright tree stand of claim 4, further including a tree encircling strap securable to an end of each of said engaging arms.

7. The upright tree stand of claim 1, further including a plurality of alternatingly positioned foot rungs secured to at least said at least one intermediate pole section.

8. The upright tree stand of claim 1, wherein said hinge is a knuckle hinge.

9. The upright tree stand of claim 1, further including a support platform adjacent said upper end of said at least one intermediate pole section.

10. The upright tree stand of claim 9, further including a seat platform adjacent said upper end of said at least one intermediate pole section and above said support platform.

11. The upright tree stand of claim 1, wherein said tree stand is adapted to receive a fall arrestor.

12. The upright tree stand of claim 1, including a pair of diametrically opposed ratchet wrench arms on said ratchet wrench and further including a flexible cord attached to an outer end of each said ratchet wrench arm.

13. The upright tree stand of claim 1, further including a tree anchor secured to said top pole section and adjacent said top securement assembly.

14. The upright tree stand of claim 1, where there are at least two of said intermediate pole sections.

15. The upright tree stand of claim 1, wherein there are three of said intermediate pole sections.

16. The upright tree stand of claim 2, wherein there are two of said tree anchors secured to said base pole section.

* * * * *